Feb. 15, 1927.
A. J. WEHR ET AL
1,617,358
TRAFFIC INDICATOR
Filed Jan. 2, 1926    2 Sheets-Sheet 1
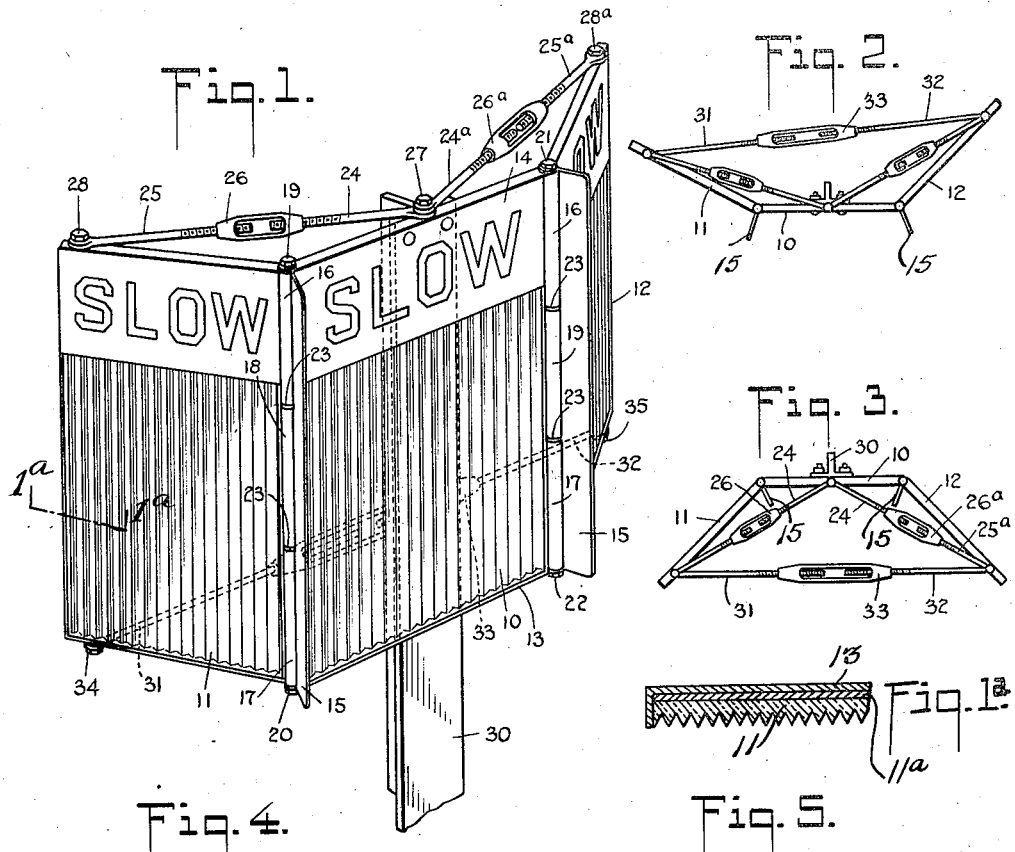
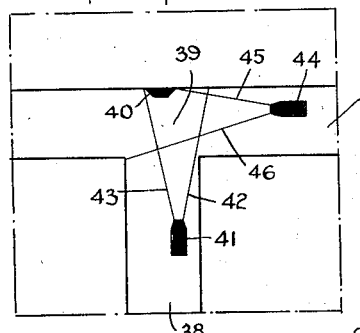
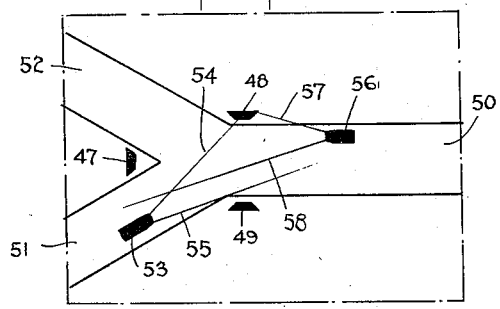
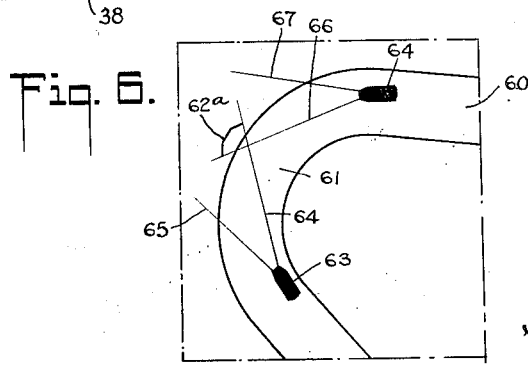
INVENTORS,
Arthur J. Wehr,
BY Aubrey V. Eliot &
Henry J. Lucke, John W. Theeres,
Their ATTORNEY.

Feb. 15, 1927.　　　　　　　　　　　　　　　　　1,617,358
　　　　　　　　　A. J. WEHR ET AL
　　　　　　　　　TRAFFIC INDICATOR
　　　　　　　Filed Jan. 2, 1926　　　2 Sheets-Sheet 2
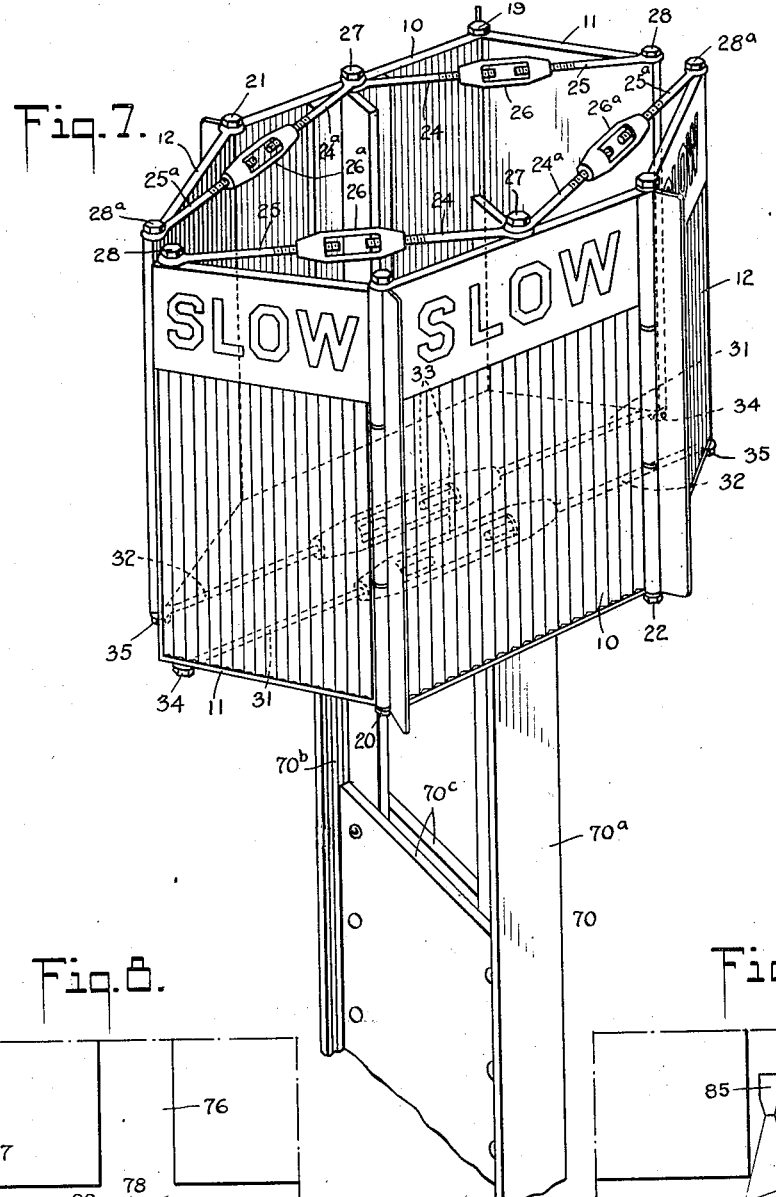
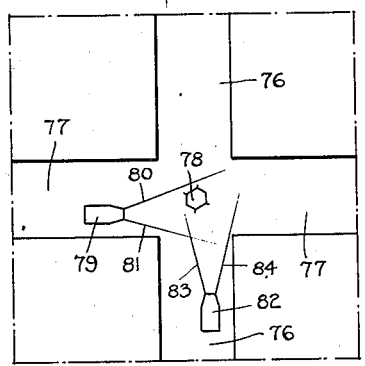
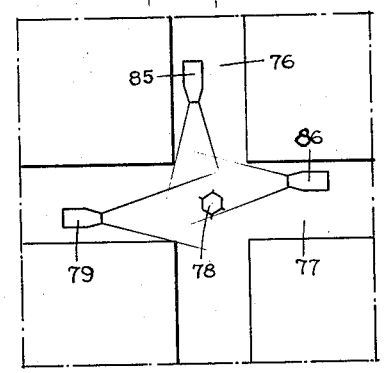
INVENTORS,
Arthur J. Wehr,
Harry V. Eliot &
John W. Steeres,
BY Henry J. Locke, their ATTORNEY.

Patented Feb. 15, 1927.

1,617,358

UNITED STATES PATENT OFFICE.

ARTHUR J. WEHR, AMORY V. ELIOT, AND JOHN W. SHEERES, OF FORT MONMOUTH, NEW JERSEY.

TRAFFIC INDICATOR.

Application filed January 2, 1926. Serial No. 78,763.

This invention relates to signals.

An object of our invention is to provide a signal comprising two or more colored sections for indicating danger, caution and the like, which is effective at night-time without the requirement of lighting energy and is visible in daytime.

A further feature of our invention is the provision of a plurality of colored faces and mounting means therefor arranged to locate the faces at varied angles with respect to the points of the compass and to correspond generally or precisely to the angles of intersection of two or more roadways and to the angle of divergence of curved roadways.

The coloring of the signal faces may be uniform to indicate danger or may be of different colors to indicate relative degrees of danger.

Pursuant to the most preferred form of our invention, the signal is supported by a vertical standard arranged to be embedded in concrete, earth or on a stand at the intersection or curve of the roadway, three mirrored faces bearing respectively red, green and yellow coloring, indicating corresponding degrees of danger, adjustable means for positioning the colored reflecting faces relative to the standard and light shielding partitions between the colored faces. The three signal faces also bear respectively legible indications or instructions. The signal is accordingly visible at night by the light furnished by the headlights of the automobile of any particular driver and bringing to view of such particular driver the appropriately indicating signal face which is positioned in accordance with the nature of the danger arising by reason of the angle of the crossing or curve of the roadway. At daytime the legible indication is also visible to the driver.

A corresponding signal face is rendered visible to the driver of any particular automobile by the headlight of other automobiles approaching the signal and the indication given to the driver by such illuminated signal face predicates the degree of danger arising in such circumstances.

Further features and objects of the invention will be more fully understood from the following detail description and the accompanying drawings, in which—

Fig. 1 is a perspective view of a form of signal comprising three-light-reflecting faces, embodying our invention;

Fig. 1ª is a detail sectional elevation on line 1ª—1ª of Fig. 1;

Fig. 2 is a top plan view of Fig. 1, on a reduced scale;

Fig. 3 is a top plan view of Fig. 1, showing the three light-reflecting faces at a varied angle as compared with Fig. 2;

Figs. 4, 5 and 6 are diagrams indicating the use of our invention for three different types of traffic conditions;

Fig. 7 is a top perspective view of a modification of our invention; and

Figs. 8 and 9 are diagrams showing varied traffic conditions in the use of our signal shown in Fig. 7.

Referring to Figs. 1 and 2, the signal comprises three reflecting faces, the central face being designated 10, the left-hand face 11 and the right-hand face 12. Preferably, the central light-reflecting face 10 is colored red, which may be attained by the use of red glass. The left-hand light-reflecting face 11 may be red or may be green as preferred. The right-hand face may be yellow or red as preferred.

Each reflecting face 10, 11, 12 is formed of glass colored with the appropriate coloring matter. The glass may be of fluted formation, that is to say, of a series of substantially parallel, vertically extending curved concaves, for the purpose of providing a plurality of face portions which individually serve as reflecting areas extending over a wide angular range to project light rays to the eyes of a particular driver from a headlight of the automobile of the particular driver or of another automobile. The glass face material may be integral for each face, or may be formed of a number of glass strips, as will be apparent.

Each glass strip is mounted in a suitable frame 13 of steel and suitably secured therein. A backing mirror 11ª is preferably employed, interposed between the front face of the frame 13 and the glass face of the signal, to increase the degree of reflection.

If desired, each face of the signal may be reflecting for only a portion of its height, the remaining portion as indicated at 14 bearing a written indication such as the word "slow" or other appropriate designation or instruction.

Preferably, between each face of the signal we provide a partition 15 of non-transparent material, such as non-corrosive metal. The frames of the faces 10, 11 and 12 are hinged to one another, as, for example, by means of spaced ears 16, 17, secured to or integral with the frame at the left-hand edge of the central face 10 and the ear 18 secured to or integral with the frame of the left-hand face 11, the bolt 19 passing through said ears 16, 17, 18 and secured by its nut 20. Similar, spaced ears 16 and 17 are provided at the right-hand edge of the frame of the central face 10 and the ear 19 secured to or integral with the frame of the right-hand signal face 12, through which passes the bolt 21 secured by its nut 22. The partitions 15 are readily assembled by providing each partition with the pair of eyes 23 which are received respectively between the aforesaid set of ears, 16, 17 and 18 and the ears 16, 17, 19, the bolts 19, 21 respectively passing also through the sets of ears 23.

The adjustment of the angles of the planes of the respective signal faces 10, 11, 12 is attained by means of a set of eye-arms 24, 25, respectively provided with right and left threadings at their adjacent ends and receiving corresponding threadings of the turnbuckle 26. The eye of the eye-arm 24 is pivotally secured to the headed pin 27 at the upper edge of the central signal face 10 and the eye of the eye-bar 25 pivotally secured to the headed pin 28 at the upper edge of the left-hand signal face 11. The eye-arms 24ª, 25ª are similarly employed for the adjustment of the right-hand signal face 12 relative to the central signal face 10 and like parts are indicated by like reference numbers with the suffix "a."

The support for the signal as an entirety is conveniently had by the provision of the eye-bar 30, to the upper end of which the signal 32 is secured in any suitable manner as by rivéting, welding or the like. The lower end of the eye-bar 30 is embedded in concrete, earth or on a stand. For attaining enhanced rigidity between the respectively movable signal faces 10, 11, 12, a set of eye-arms 31, 32 may be employed, coacting with the turnbuckle 33. The eye of the eye-arm 31 is held to the bolt 34 tapped in a suitably threaded opening in the casing of the left-hand signal face 11 and the eye of the eye-arm 32 is similarly secured to the bolt 35 tapped in a suitably threaded opening in the frame of the right-hand signal face 12.

In Fig. 1 the respective signal faces 10, 11 and 12 are adjusted to substantially equal angular relation for the left-hand and right-hand signal faces 11, 12 respectively relative to the central signal face 10. In Fig. 2 the angular relation of the left-hand face 11 relative to the central face 10 is at a greater obtuse angle than the angular relation of the right-hand face 12 relative to the central face 10.

The form of our invention as illustrated in Fig. 1 is applicable for positioning the signal faces to form so as to speak a "re-entrant" angle with one another as is illustrated in Fig. 3, in which circumstance the sets of eye-bars and turn-buckles are disposed forwardly of the reflecting faces 10, 11, 12. Such adjusted form of our invention is applicable for the "bends" of a curved or other irregular roadway, as appears more fully hereinafter.

In Fig. 4 there is illustrated diagrammatically the roadway 37 meeting the roadway 38 at a so-called "blind" corner 39. Our signal is indicated at 40 and the signal faces adjusted relatively to one another in correspondence to the angle of intersection of the roadways 37, 39, in this instance, as shown in Fig. 1. 41 indicates an automobile which is approaching the "blind" corner 39, and the approximate area of the lighting of its headlights is indicated by the diverging lines 42, 43. Upon the approach of the automobile 41 to the signal 40, the lighting of its headlights illuminates the central signal face 10, thus showing "red" or danger to the driver of the automobile 41. Assuming no automobile to be within the range of lighting of the signal 40, the driver of the automobile 41 sees solely the lighting effect by the headlights of his own automobile 41. The lighting effect to such automobile driver is that of the full expanse of the central face 10 of the signal 40. As the driver of the automobile approaches more and more closely to the "blind" corner 39, the lighting by the headlights of his own automobile 41 brings to view more and more the right-hand signal face 12, the illumination of which increases more and more as his automobile 41 approaches the "blind" corner 39, the partition 15 between the central lighted face 10 and the right-hand face 12 appearing as a shadow between the two lighting faces 10, 12.

Now, assuming another automobile 44 to be travelling along the roadway 37 toward the "blind" corner 39, and also assuming for the moment that the aforesaid automobile 41 is not on the roadway 38, the headlights of the automobile 44 will illuminate the right-hand signal face 12 of the signal 40 and present the same to the view of its driver. The plane of the lighted signal face 12 is in this instance at right angles to the general direction of travel of the automobile 44, thus indicating "danger." If the color indication of yellow is employed for the right-hand face 12, such color indication shows "caution", a symbol which might be employed for the traffic condition of a blind corner or the like to indicate that the intersecting roadway does not extend beyond the corner 39.

Now, assuming the automobile 41 to be travelling along the roadway 38 toward the "blind" corner 39, the driver of the automobile 44, perceiving first the illumination of the right-hand signal face 12, also perceives to increasing extent as his automobile 44 approaches the "blind" corner 39 portion of the increased illumination being effected by a portion furnished by the light waves of the headlights of the automobile 41, which last-named portion increases as the automobile 41 itself approaches the signal 40.

In Fig. 5 the use of our signal is indicated at the three-corners 47, 48 and 49 of the three-cornered intersection of the roadways 50, 51, 52. In this instance the signal faces 10, 11 and 12 are set to correspond approximately to the respective angles of the three-corner intersection of the roadways 50, 51, 52. The headlights of the automobile 53 upon approaching the three-corners effects the illumination of the signal 48, which alone is within the range of lighting of its headlights indicated in lighting area by the diverging lines 54, 55. The driver of the automobile 53 upon approaching within visibility of the signal 48 sees both its central and its left-hand signal faces illuminated and the two lighting areas separated by a "shadow" caused by the intervening partition 15, thereby indicating an "angle" between the roadways at the intersection. Upon further approach of the automobile 53 to the signal 48, the right-hand face 12 of the signal 48 will become more and more illuminated, the three lighted areas indicating to the driver that a three-way intersection is being approached. In the event that another automobile is on either two roadways 50, 52, or an automobile on both roadways 50, 52, as discussed hereinafter, the illumination of the right-hand signal face 12 or of the left-hand signal face 11 respectively, or both, as the case may be, then the illumination is further increased in intensity.

However, in the event that another automobile 56 is approaching along the roadway 50 toward the "three-corners", the range of its lighting indicated by the diverging lines 57, 58 brings the right-hand face 12 of the signal 48 to the view of the operator of the automobile 56 when looking forwardly. In the event that the operator of the automobile 56 should glance toward his left, the central face of the signal 47 and the right-hand face of the signal 49 will be also brought to view, thus indicating that the roadways 52, 51 respectively turn at an angle to the roadway 50. The illumination of the three spaced signals should indicate a three-corner, non-right-angle intersection.

The signal 49 at the location shown in Fig. 5 is effective for automobiles approaching along the roadway 52 toward the "three-corners" and the indication effected by the respective faces of the signal 49 shows the relative dangers attending the approach of the automobile according to the hazards arising by the approach of such automobile or of the approach simultaneously of the automobiles along the roadways 51, 50 as well as the roadway 52.

In Fig. 6 is illustrated a roadway 60 which is curved at the location 61 and at the "bend" of the curve 61 is appropriately positioned the signal 62$^a$ embodying our invention. In this instance the three signal faces of the signal 62$^a$ are set in accordance with the "angle" of the bend, namely making re-entrant angle of the general relationship illustrated in Fig. 3. The headlights of the automobile 63 cast light rays of the range indicated by the diverging lines 64, 65, thus directly illuminating the right-hand signal face, a portion of the reflection of the light waves being visible to the driver of the automobile 63 and a remaining portion of the light waves being reflected to the left-hand signal face of the signal 62$^a$ and again reflected by the latter in the direction of the continuation of the roadway 60 in advance of the position of the signal 62$^a$ and in the direction forwardly of the automobile 63, thereby bringing to the view of the operator of another automobile 64 which, we will assume, is travelling along the roadway 60 toward the "bend" 61 in a direction opposite to that of the automobile 63.

The use of our invention at such a "bend" or the like of a roadway, with the lateral signal faces positioned to cause a double reflection of the light waves from one lateral signal face to another lateral signal face, to project the finally reflected light waves in a direction forwardly of the headlights of the automobile furnishing the illumination, is of an advantage to pedestrians or other parties travelling along the roadway without a headlight or other illumination, thus enabling such pedestrian or other party to see around a corner and to be apprised of the traffic conditions.

Should there be another automobile, say the automobile 64, the illumination furnished by its headlights serves to project light waves by double reflection, that is to say, by reflection from the left-hand signal face to the right-hand signal face and thence in a direction toward the driver of the automobile 63.

In the use of our signal with red coloring for all three faces, the nature of the hazards arising from the particular circumstances of the roadway and of the traffic conditions is indicated by the area or areas illuminated and the "angle" between the illuminated areas indicated by the relative effective areas of illumination, as the circumstances may arise. With the use of different coloring for the three signal faces, namely red for the central signal face, green for the left-hand signal face and yellow for the right-hand signal face, the indication is emphasized by the number of colors rendered visible.

Our invention is also applicable for the use of a signal disposed at substantially the center of the intersection of two or more roadways. In the form of our invention represented in Fig. 7, the post 70 is of metal or other suitable material, the lower end of which is embedded in concrete, earth, or in a metal stand. The post 70 is preferably of dual construction, namely a T-post 70$^a$ at one side, a similar T-post 70$^b$ at the opposite side and interconnected by the oppositely applied plates 70$^c$, respectively secured to the posts 70$^a$, 70$^b$ by rivets or the like.

To the post 70$^a$ is secured a set of signal faces, such as three in number, corresponding to the signal faces of the construction shown in Fig. 1 and like parts are indicated by like reference numbers.

The post 70$^b$ similarly carries another set of similar signal faces, such as three in number, of the form shown in Fig. 1, and like parts of this signal are indicated by like reference numbers.

The total number of such signal faces is accordingly six, but it will be understood that an additional signal face may be pivotally secured to the outermost edge of, say, the left-hand signal face 11 of the set of signals, carried by the posts 70$^a$, and similarly at the right-hand edge, as appears in Fig. 7, of the opposite signal 11 of the set of signals carried by the post 70$^b$, (which signal face 11 from the front appears as the left-hand signal of the latter-named set), thus providing for eight signal faces, and such number may be increased as may be desired.

As one form of use of our signal of the type shown in Fig. 7, we have illustrated in Fig. 8 the same located at the intersection of the roadways 76, 77 which cross at substantially right angles. The signal is shown at 78 substantially centrally of the area of the roadway intersection. Assuming the automobile 79 to be travelling along the roadway 77 toward the intersection and the lighting area of its headlights indicated by the diverging lines 80, 81, and assuming no other automobile to be within lighting range of the signal 78, the driver of the automobile 79 perceives at least two lighted faces of the signal, separated by the dark spacing effected by its intervening non-transparent partition, as aforesaid. As the automobile 79 approaches to practically the area of roadway intersection, additional lighted faces of the signal will appear illuminated by his own headlights.

Now, assuming another automobile 82 to be approaching the same intersection, say, along the roadway 76 to the right of the automobile 79 and in advance of the signal 78, the headlights of the automobile 82 having the range of lighting indicated by the diverging lines 83, 84 will also add illumination to the already lighted signal faces illumined by the headlights of the automobile 79 and one or more additional lighted faces will become visible to the driver of the automobile 79 arising from the illumination of the headlights of automobile 82.

In Fig. 9 the intersection of the roadways 76, 77 is similar as in Fig. 8, and the signal 78 is indicated substantially centrally of the intersectional area. The automobile 79 is shown travelling along the roadway 77 and approaching the intersection. Another automobile 85 is shown on the roadway 76 approaching the signal 78 in a direction to the left of the driver of the automobile 79. In this instance, an additional lighted area to the left of the areas lighted by the headlights of the automobile 79 will be visible to the driver of the automobile 79, due to the lighting by the headlights of the automobile 85.

A third automobile is shown at 86 approaching the intersection to the left of the driver of the automobile 85 and corresponding added indications are given by additional lighted faces of the signal 78 to the driver of the automobile 86 due to the lighting effected by the headlights of the automobile 86.

Fig. 9 also illustrates the traffic indication given to the driver of the automobile 85 arising from the lighting of the two automobiles 79, 86 approaching along the roadway 77 from opposite directions toward the signal 78, namely, in the form of the maximum number of four, in this instance, of lighted faces of the signal 78, and a highly intensified illumination of the two central lighted faces arising from the combined illumination respectively of the headlights of the oppositely approaching automobiles 79, 86.

It will be understood that the angular relationship of the right-hand and left-hand signal faces respectively relative to the central signal face for each of the sets of signal faces carried by the posts 70$^a$ and 70$^b$, may be varied as desired, and including the relationship of "re-entrant" angle of the character illustrated in Fig. 3 and diagrammed at 62$^a$ in Fig. 6, and that generally the relationship between the angles of the lateral signal faces relative to the central signal face of each set corresponds to the angle between the intersecting roadways.

It will be clear that, if desired, the glass of each signal face may be smooth at the front and the refracting portions of the glass may be disposed at the rear, or that the glass for each signal face is smooth on both its front and rear faces. With those of glass smooth on both faces, colored as desired, and a reflector interposed between the rear face of the glass and the frame of the signal, the direction of the reflected rays is more sharply defined.

It will be understood that suitable sheets of metal may be positioned forwardly of the front faces of the glass, as of general triangular shape, for the purpose of protecting the glass at the edges when contacted by automobiles, or stones or other missiles wantonly or accidentally thrown.

Whereas, we have described our invention by reference to specific forms thereof, it will be understood that many changes and modifications may be made without departing from the spirit of the invention.

We claim:

1. In a traffic signal, supporting means, a signal face carried by said supporting means, a second signal face hinged to said first-named signal face, a third signal face disposed opposite to said second-named signal face and hinged to said first-named signal face and adjustable connecting means mechanically connecting said second-named signal face and said third signal face respectively with said first-named signal face at locations remote from said hinges.

2. In a traffic signal, supporting means, a signal face carried by said supporting means, a second-named signal face disposed at the left-hand side of said first-named signal face, hinged means connecting said second-named signal face with said first-named signal face, a pair of eye arms and a turn buckle adjustably connecting said second-named signal face with said first-named signal face, a third-named signal face disposed at the right-hand side of said first-named signal face, hinged means connecting said third-named signal face with said first-named signal face and a pair of eye arms and a turn buckle adjustably connecting said third-named signal face with said first-named signal face.

3. In a traffic signal, supporting means, a signal face carried by said supporting means, a second signal face, a partition disposed between said first-named signal face and said second-named signal face, and projecting forwardly of said faces and common pivotal means for carrying said partition and for connecting said second-named signal face to said first-named signal face, a third signal face, a partition between said third signal face and first-named signal face, projecting forwardly of said third signal face and said first-named signal face, and common pivotal means for carrying said second-named partition and for connecting said third-named signal face to said first-named signal face, adjustable means connecting said second-named signal face with said first-named signal face and adjustable means connecting said third-named signal face with said first-named signal face.

4. In a traffic signal, supporting means, a signal face carried by said supporting means, a second signal face, a non-transparent partition disposed between said first-named signal face and said second-named signal face, and projecting forwardly of said faces and common pivotal means for carrying said non-transparent partition and for connecting said second-named signal face to said first-named signal face, a third signal face disposed opposite to said second-named signal face, a non-transparent partition disposed between said first-named signal face and said third-named signal face and projecting forwardly of said first-named signal face and said third-named signal face, common means for carrying said first-named non-transparent partition and pivotally connecting said third-named signal face, adjustable means connecting said second-named signal face with said first-named signal face and adjustable means connecting said third-named signal face with said first-named signal face.

5. In a traffic signal, supporting means, a signal face fixedly carried by said supporting means, a second signal face, a non-reflecting partition, common means for hingedly supporting said partition between and to project forwardly of said first-named signal face and said second-named signal face and for hinging said second-named signal face to said first-named signal face, a third signal face, means for pivotally connecting said third signal face to said first-named signal face, adjustable means for setting the face of said second-named signal face relative to the face of said first-named signal face and adjustable means for setting the face of said third-named signal face relative to the face of said first-named signal face.

In testimony whereof we have signed this specification this 14th day of October 1925.

ARTHUR J. WEHR.
AMORY V. ELIOT,
JOHN W. SHEERES.